May 26, 1970     J. J. TOMECEK     3,513,718

CONTROL SYSTEM ADJUSTMENT MEANS

Filed Feb. 15, 1968     7 Sheets-Sheet 1

JERRY J. TOMECEK INVENTOR.

BY HARNESS,
DICKEY & PIERCE

JERRY J. TOMECEK INVENTOR.

BY HARNESS,
DICKEY & PIERCE

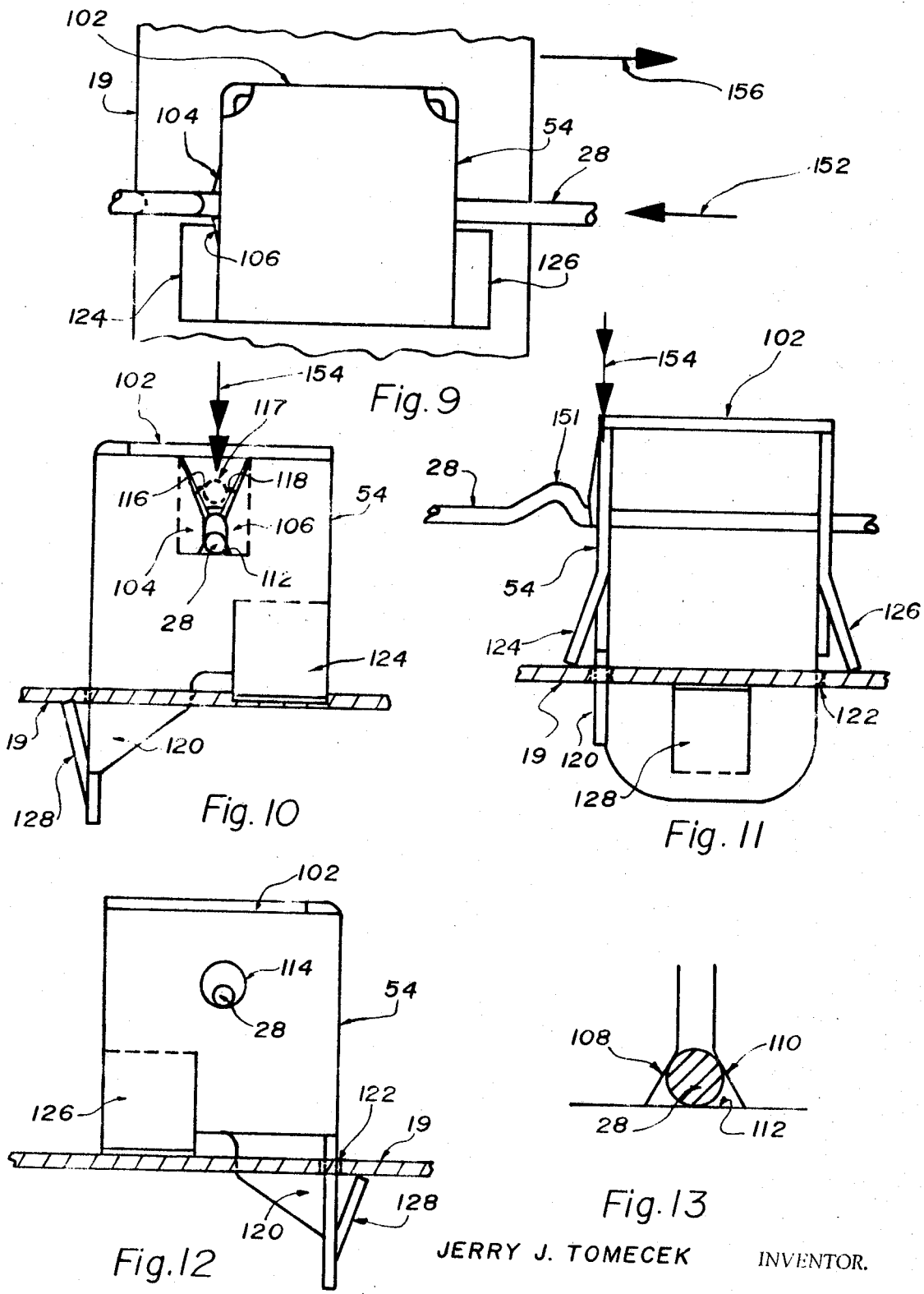

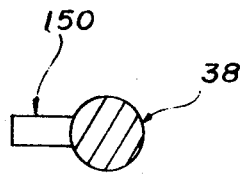
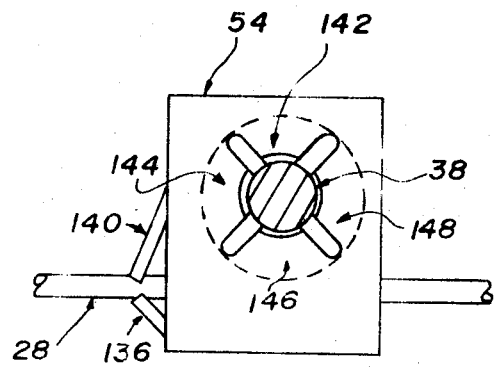
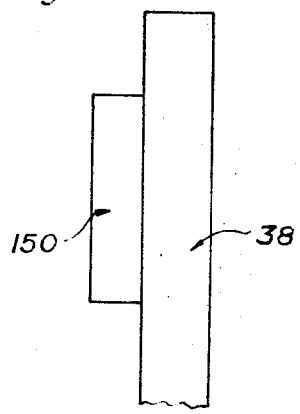
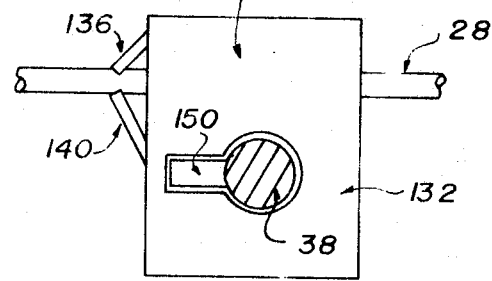
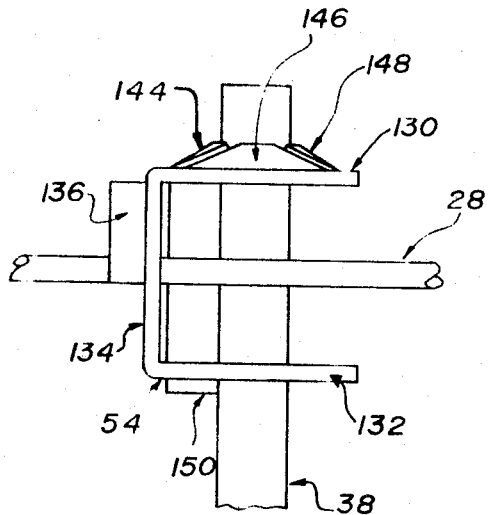
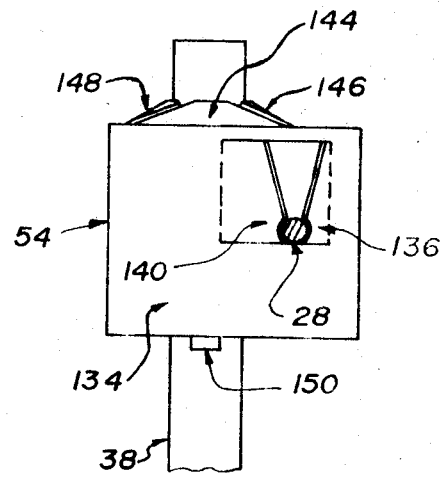

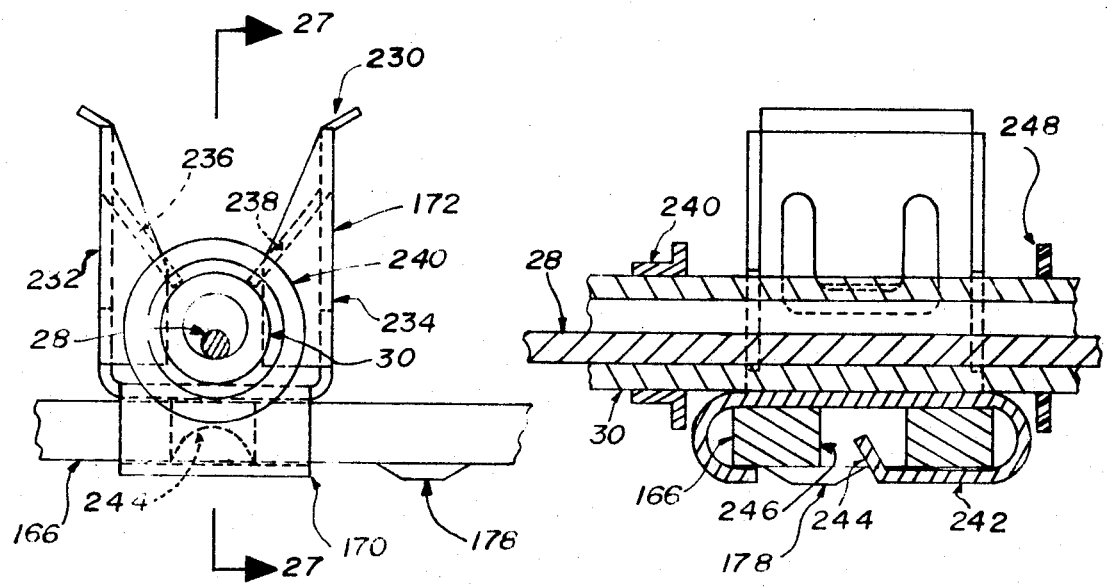

United States Patent Office 3,513,718
Patented May 26, 1970

3,513,718
CONTROL SYSTEM ADJUSTMENT MEANS
Jerry J. Tomecek, 1330 Dorre, Troy, Mich. 48084
Filed Feb. 15, 1968, Ser. No. 705,661
Int. Cl. F16c 1/10
U.S. Cl. 74—501    36 Claims

ABSTRACT OF THE DISCLOSURE

There is herein disclosed control system adjustment apparatus comprising a control wire mounted in a wire sheath and connected between an actuator device and an actuable device. Special adjustment clips and apparatus are provided for mounting and connecting the wire and sheath relative to the actuator device and the actuable device. A special method of adjustment is provided to orient the control wire, the actuator device, and the actuable device relative to one another.

BACKGROUND OF INVENTION

This invention relates generally to any control system which employs a control wire or the like. In the illustrative embodiment hereinafter described, the control wire is mounted in a sheath or conduit. A particular application of the present invention is in vehicular air conditioning and heater control systems. More particularly, and by way of example, this invention is directed to the problem of mounting and connecting a control wire between an adjustment element (actuable device) or the like of a heater or air conditioner unit or the like mounted in the engine compartment or on the firewall or floor or elsewhere in the vehicle and a control lever (actuator device) or the like remotely located on the instrument panel or the like in the passenger compartment of the vehicle. In the prior art, there has been an assembly problem of correlating the position of the adjustment element and the position of the control lever which has often caused wide variation in operational characteristics of heating, cooling, and ventilation systems of mass production vehicles. This invention provides apparatus and methods for effecting a much higher degree of standardization in assembly with a minimum number of relatively inexpensive adjustable parts requiring minimum adjustment manipulation by the assembly worker while insuring that the assembled apparatus is in proper working order. In addition, the present invention provides adjustment means continuously effective to enable adjustment at the factory during assembly or during final inspection or by the purchaser without requiring anything other than simple manipulation of the actuator device of the control system.

BRIEF DESCRIPTION OF THE DRAWINGS

FIG. 9 is a top view of another adjustment clip assembly embodying features of the present invention;

FIG. 10 is an end view of the assembly shown in FIG. 9;

FIG. 11 is a front view of the assembly shown in FIG. 9;

FIG. 12 is another end view of the assembly shown in FIG. 9;

FIG. 13 is an enlarged partial view of the jaw portion of the clip of FIG. 9;

FIG. 14 is a side elevational view of another type of adjustment clip assembly;

FIG. 15 is another side elevational view of the assembly of FIG. 14;

FIG. 16 is an end view of the assembly of FIG. 14;

FIG. 17 is another end view of the assembly of FIG. 14;

FIG. 18 is a detail view of the shaft portion of the assembly of FIG. 14;

FIG. 19 is an end view of the shaft portion of FIG. 18;

FIG. 26 is a side elevational view of another form of an adjustment clip assembly; and FIG. 27 is a cross-sectional view taken along the line 27—27 in FIG. 26.

The same reference numerals have been utilized for common parts of the various illustrative embodiments of the inventive features shown in the various figures of the drawings.

IN GENERAL

Figure 1:
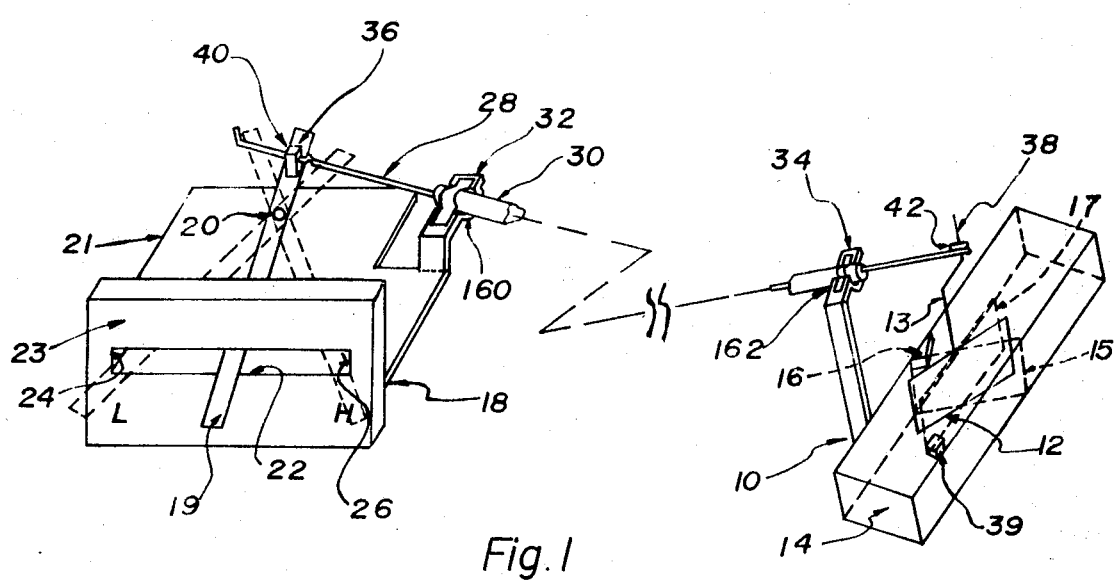
FIG. 1 is a schematic illustration of a vehicle heating or air conditioning control system embodying the present invention.

While the inventive features are illustratively shown to be embodied in a vehicular heater control system it is to be understood that those skilled in the art will be readily able to adapt these features for use in other systems in other environments without departing from the basic principles herein disclosed. Referring now to FIG. 1, a heater unit 10, usually mounted along the vehicle firewall, is shown to comprise an adjustment element 12 (actuable device), illustratively in the form of a shutter, pivotally mounted on a shaft 13 in an air duct 14, or the like, and being movable between a fully closed position at 15, extending generally transversely of the flow passage, in engagement with a locating stop or abutment 16, and a fully open position at 17 extending generally parallel to the flow passage to control the passage of air therethrough, for example. A control unit 18, usually remotely mounted in the vehicle dashboard, comprises a pivotally mounted control lever 19 (actuator device) pivotally mounted at 20 on a support flange 21 and extending through a slot 22 in a decorative plate 23. The amount of pivotal movement of the control lever is limited by the ends 24, 26 of the slot, for example, and indicia such as L and H may be provided to indicate the relationship between the control lever 19 and the adjustment element 12.

Lever 19 is operably connected to shutter 12 by control means in the form of a flexible control wire 28 mounted in a flexible sheath 30. In the present invention, one end of the sheath is adjustably connected to a bracket member at 32 or 34, or one end of the wire is adjustably connected to the lever at 36 or to a shutter crank arm at 38. Adjustment clip means 40 of varying design are utilized to connect at least one end of the control wire (and/or the wire sheath) to the actuator device and/or the actuated device as hereinafter described in detail. While in the illustration of FIG. 1 the clip 40 is shown to connect wire 28 to lever 19 at 36, it is contemplated that the clip may be located at 32, 34, or 42, or any combination thereof, and that either the wire or the sheath or both may be adjustably attached.

In the prior art, special adjustment devices have been provided to take up slack in the wire 28 and/or sheath to enable the system to be properly adjusted. However, because of substantial dimensional variations from vehicle to vehicle and unit to unit, it has been very difficult to obtain the desired relationships without careful assembly and adjustment of the mechanism requiring a relatively long assembly time and relatively expensive parts. The present invention provides a method and means for connecting the actuable device 12 to the actuator device 19 in a manner insuring proper operational relationship and requiring a minimum of assembly skill and time.

More particularly, the present invention provides a method and means for connecting the illustrative heater control unit 18 to the illustrative heater unit 10 so as to be able to operate the illustrative shutter 12 to and from at least one of its extreme positions and to have the control lever positioned in one of its extreme positions at the same time. In the illustrative heater unit of FIG. 1, it is desired to have the shutter 12 located in a minimum or no heat position, e.g. at 15, whenever the control lever 19 is in one of its extreme positions, e.g. at 24. Thus in a properly assembled and oriented system, the control lever 19 is in the one of its extreme positions whenever the shutter 12 is in the minimum or no heat position. If the positions of the control lever and the shutter are so correlated with the proper length of control wire, then positive placement of the shutter in the one position will always be attained. If the positioning of the shutter in the other extreme position, i.e. a maximum heat position at 17, for example, is not critical, then it may be located more or less at that position without any detrimental effect on the heating system. Thus, in the illustrative system, when the control lever 19 is in the extreme lefthand position against the end 24 of slot 22 above L, the shutter 12 is in the fully closed position against the stop 16. As the control lever is moved toward the extreme righthand position, the shutter is moved toward the fully open position at or about 17. When the control lever engages the end 26 of slot 22 above H, the shutter will be slightly short of, at, or slightly beyond the fully open position depending upon manufacturing and assembly tolerances. In some environments, a positive stop 39 may locate the shutter in the other position.

ADJUSTMENT CLIP ASSEMBLY METHOD

In one form of the invention, the control wire 28 may be connected between the control lever 19 and the crank arm 38 by wire adjustment clip means 40 at one end and by a wire loop or coil 42 at the other end. In the preferred embodiment, the wire clip means is mounted on control lever 19 and the wire loop 42 is placed over the crank arm 38. However, these positions may be reversed as will hereinafter become apparent. A feature of this form of the invention is that one end of the control wire is permanently connected to one of the control lever or crank arm while the other end is first adjustably associated with the other member and then more or less permanently connected thereto during an adjustment operation as will be described hereinafter in detail. The term permanent connection as used herein is intended to mean that the relative positions of the connected parts do not thereafter change during ordinary operation of those parts to vary the position of the controlled element such as the heater shutter. Thus, while the looped end of the wire may be lifted off or placed on the crank arm during assembly or disassembly operations, after assembly the looped end remains in operative engagement with the crank arm throughout the life of the mechanism unless deliberately removed for repair or the like. Similarly, once the control wire is properly located in the adjustment clip, the clip end of the wire is thereafter held in operative engagement with the clip throughout the life of the mechanism unless deliberately removed or adjusted.

The present invention provides a method of assembly by which the permanently connected end 42 of the control wire 28 is first looped over the element 38 with which it is associated and then the adjusted end of the wire is first adjustably associated with the adjustment clip 40 and then adjusted relative to the clip until the desired operational relationships are established. The wire is adjustably associated with the adjustment clip with the control lever 19 in an intermediate position short of the extreme position which it is desired to correlate exactly with one of the extreme positions of the adjustment element of the heater shutter. If the low heat position of the lever 19 is to be correlated to the closed position of the shutter, for example, the wire is associated with the adjustment clip so that the length of the wire between the control lever and the shutter is more than the desired length at the low-closed position. Then the control lever is moved toward the extreme low position. The shutter is also moved toward its extreme closed position. Since the connected length of the wire is more than the desired length, the shutter 12 will engage the stop 16 before the control lever 19 engages the abutment 24 provided by the end of slot 22. At this time the control lever is forced to its extreme position against abutment 24 and the position of the wire relative to the adjustment clip is changed by sliding movement therebetween to allow the connected length of wire to be decreased until, at the extreme low position of the control lever, the exact length of wire needed to move the shutter to its extreme closed position is provided. A permanent connection between the adjustment clip and the wire is simultaneously established whereby the shutter is thereafter movable between its extreme positions as the control lever is moved between its extreme positions. It will be obvious that this method contemplates adjustment in the high-open position as well by merely reversing the position of the elements and utilizing a lesser length of wire in the initial position increased to the desired length during adjustment. Also, the general method may be utilized in connection with the sheath in combination with the wire or by itself as will be hereinafter described in detail.

ADJUSTMENT CLIP APPARATUS

Figure 2:
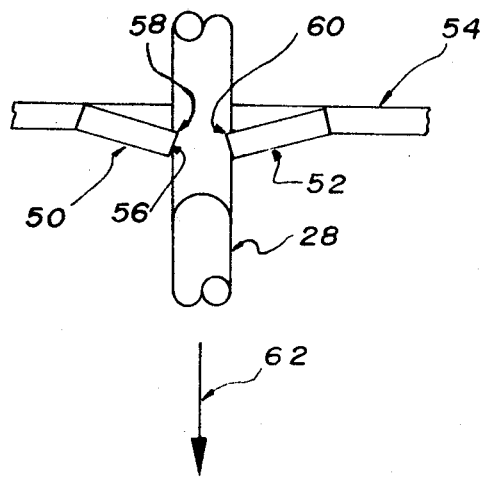
FIG. 2 is a side elevational view of one type of jaw arrangement for an adjustment clip embodying features of the present invention.

Another feature of the present invention is the provision of new and improved adjustment clip means which enable the practice of the aforedescribed method of assembly and adjustment. The clip means provides resilient gripping jaw means for releasably adjustably gripping the control means wire 28 or sheath 30. The jaw means may be formed in clips of various sizes and shapes adapted for use with wire 28 or sheath 30. Referring now to FIG. 2, one form of wire gripping jaw means is shown to comprise jaw portions 50, 52 integrally formed in a clip body 54 which is made from resilient spring steel sheet material or the like. The jaw portions 50, 52 provide a wire opening 56 which is smaller than the diameter of the wire in the normal unsprung position of the jaw portions. Gripping edges 58, 60 are provided along one side edge of the jaw portions. When the wire is located therebetween, the jaw portions are outwardly displaced so as to load the gripping edges and force them into biting engagement with the wire. The wire may be adjusted relative to the clip by applying a relatively large force in the direction of the arrow 62 which causes the jaw portions to be sprung open to allow sliding movement of the wire therealong. During the application of relatively small forces, in either direction, the spring force of the jaws will maintain the wire in permanently connected association with the clip.

Figure 3:
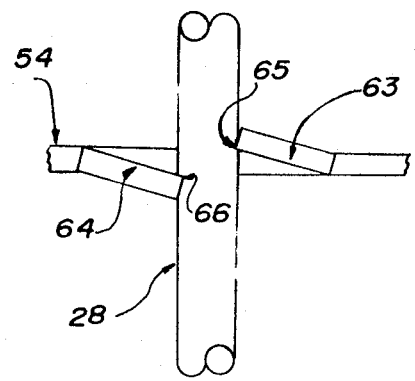
FIG. 3 is a side elevational view in cross-section of another type of jaw arrangement for an adjustment clip embodying features of the present invention.

Another form of jaw means is shown in FIG. 3 to comprise jaw portions 63, 64 which are displaced from the base 54 in opposite directions to provide gripping edges 65, 66 permitting adjusting movement in either direction upon sufficient loading, as indicated by arrow 67, while maintaining a permanent connection between the clip and the wire during normal usage. Various combinations of these forms of jaw means may be employed without departing from the inventive principles.

Figure 4:
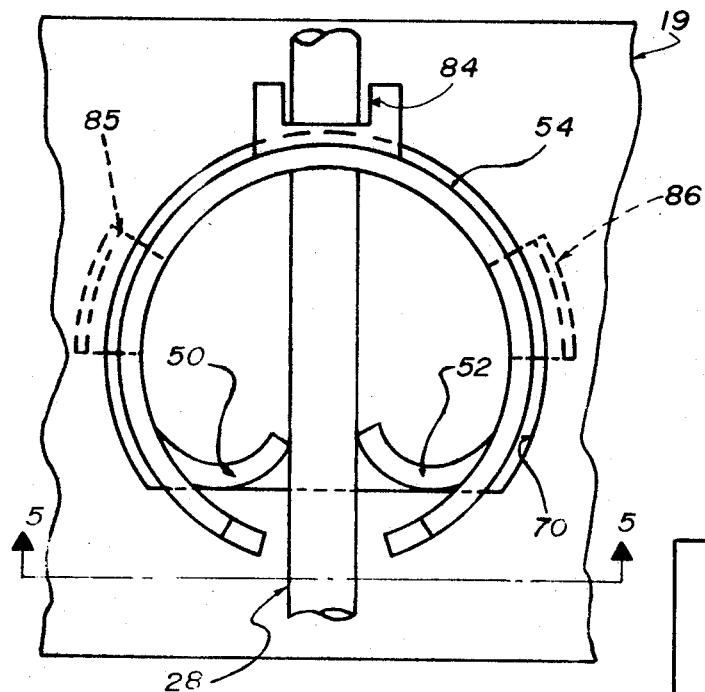
FIG. 4 is a top view of an adjustment clip assembly embodying features of the present invention.
Figure 5:
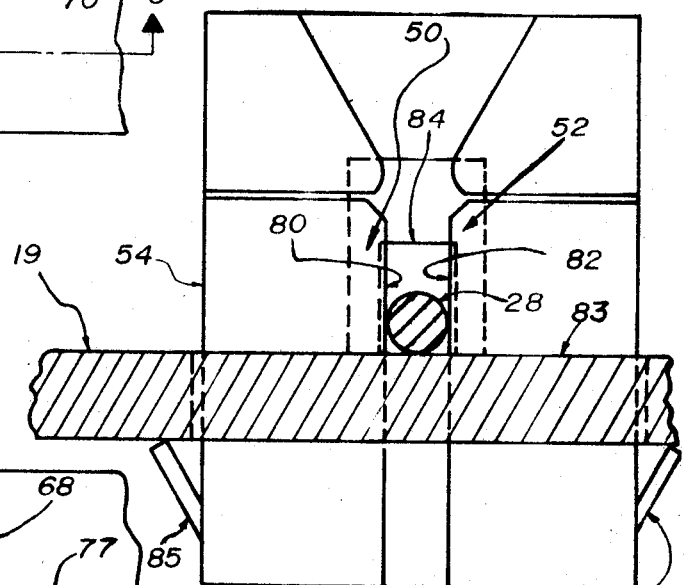
FIG. 5 is a side elevational view taken along the line 5—5 in FIG. 4.
Figure 6:
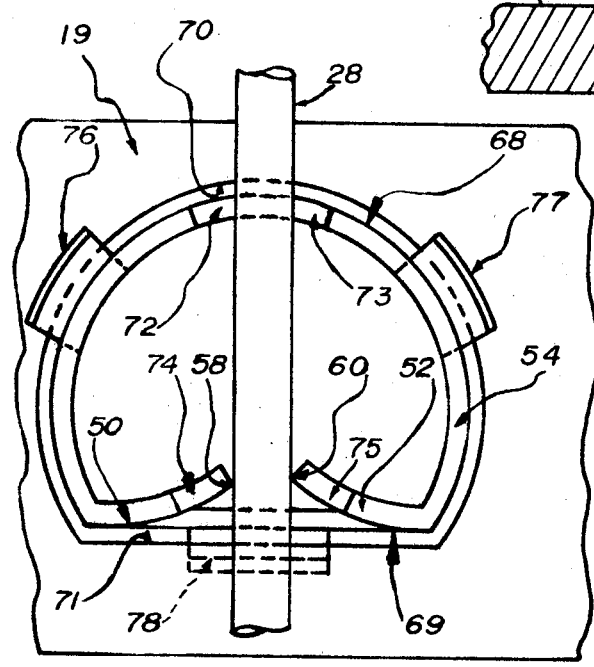
FIG. 6 is a top view of another type of adjustment clip assembly embodying features of the present invention.

Wire clip of FIGS. 4–6

One general form of adjustment clip means for the wire 28 is shown, in FIGS. 4–6, to comprise a one-piece stamping formed into generally tubular shape having a symmetrical cross-sectional configuration. One particular form of clip, FIG. 6, has a somewhat D-shaped overall cross-sectional configuration provided by a generally cylindrical surface 68 and a flat chordal surface 69. Control lever 19 is provided with a hole 70 of similar configuration so as to insure proper orientation of the clip upon assembly. Jaw portions 50, 52 provide biting edges 58, 60 which allow one way adjustment as previously described. When the wire is pulled toward surface 71 on the lever, surface 69 will abut the lever and exert a compressive force on the adjacent jaw portions tending to cause tighter gripping engagement. Since the clip is slightly undersize relative to the clip hole, some slight rotative movement of the clip is permitted. Guideways 72, 73, 74, 75 facilitate movement of the wire 28 into position between the jaws. In the assembled position, the wire rests on the surface of lever 19. Resilient holding tabs 76, 77, 78 prevent longitudinal displacement of the clip through the lever. Movement about the longitudinal axis is prevented by the chordal surface 69.

In another form of clip shown in FIGS. 4–5, the jaw portions 50, 52 are formed by inwardly curved flanges which permit self-alignment of the clip on the control lever by rotation about the longitudinal axis of the clip as the lever is moved back and forth. Thus, when mounted on a pivotally supported lever, the direction of movement of the control wire remains parallel to the direction of movement of the lever at the connection therebetween. Biting edges 80, 82 hold the wire 28 on the top surface 83 of the lever. Wire 28 is inserted through an opening 84 in a holding tab portion of the clip body which acts in combination with compressible tabs 85, 86 to hold the clip in the lever opening.

Figure 7:
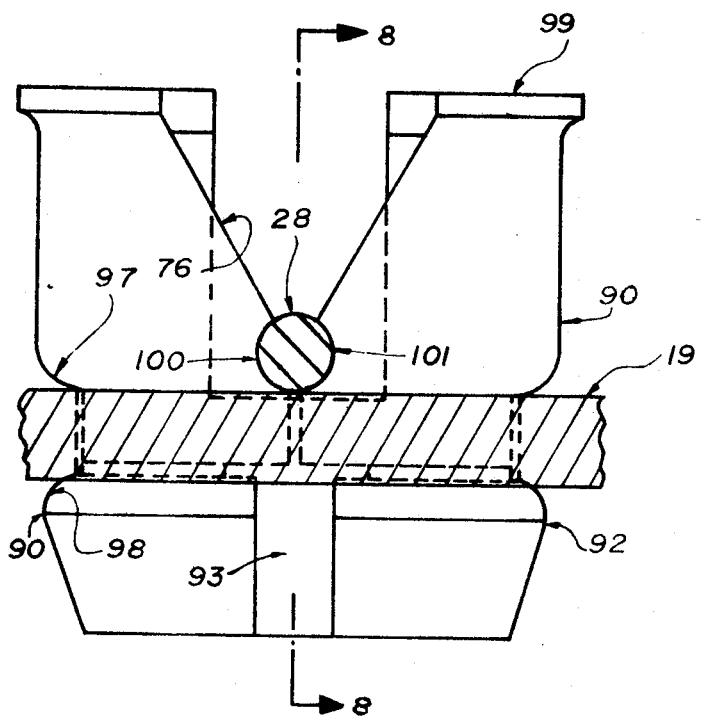
FIG. 7 is a side elevational view of another type of adjustment clip assembly embodying features of the present invention.
Figure 8:
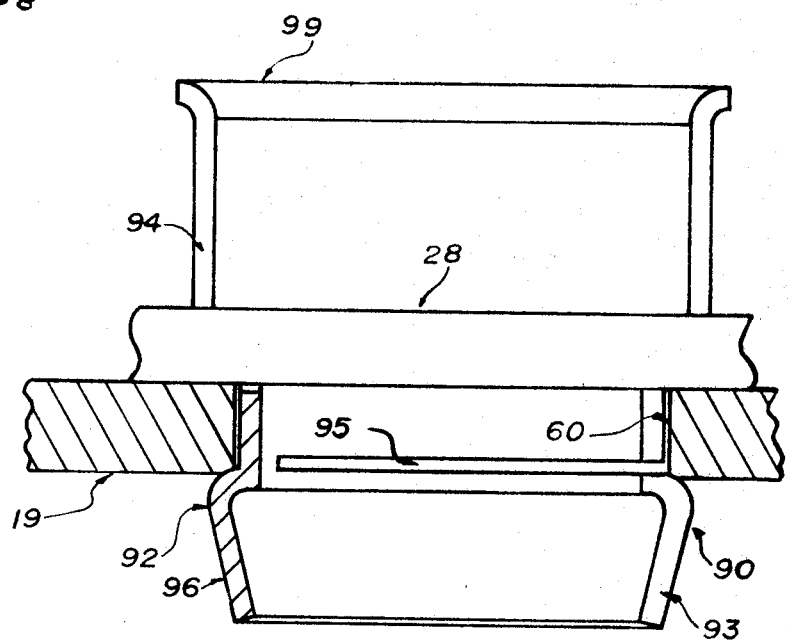
FIG. 8 is a cross-sectional view taken along the line 8—8 in FIG. 7.

Wire clip of FIGS. 7–8

In still another form of clip shown in FIGS. 7–8, the holding tabs are in the form of cylindrical ridges 90, 92 separated by a longitudinal slot 93 and separated from the body portion 94 of the clip by a circumferential slot 95 to provide resilience and compressibility whereby the clip may be snapped through the lever hole 60. A tapered surface 96 is provided to guide the clip through the lever hole. After the clip is in position, the bottom portion of the clip expands so that flange portions 97, 98 are located in abutting engagement with the lever above and beneath the lever. A small flange or flat 99 may be provided on the top of the clip to provide a bearing surface for exerting a downward force on the clip during assembly. Jaw portions 100, 101 provide circumferential line contact with the wire 28 rather than more or less point contact as shown in FIGS. 5 and 11, for example.

Wire clip of FIGS. 9–13

Still another form of wire clip is shown in FIGS. 9–13. The body portion 54 is formed into a three-sided housing having a pressure plate 102 extending across the top. Jaw portions 104, 106 are formed by flanges separated by a narrow width longitudinally extending slot and terminate in biting edges 108, 110 diverging outwardly toward and intersecting surface 112 of the lever to provide a substantially triangularly shaped jaw cavity having an unsprung clearance less than the width of the control wire as shown in FIG. 13. The control wire is held on surface 112 by biting engagement of the jaw portions through substantially point contact. An enlarged hole 114 is provided in the wall of the clip opposite the jaw portions to enable the wire to be manipulated onto approach surfaces 116, 118 prior to being pressed downwardly between the jaw portions during assembly from a position indicated generally at 117. An L-shaped orientation flange 120 may be provided for insertion through a correspondingly shaped slot 122 in the control lever. Resilient deflectable holding tabs 124, 126, 128 are integrally formed in the side walls of the housing and act to hold the clip on the control lever.

Wire clip of FIGS. 14–20

The wire clips hereinbefore described have been particularly adapted for mounting on a control lever or the like. It is also contemplated that the wire clip may be mounted on a rod such as crank arm 38, for example, as shown in FIGS. 14–20. In this form, clip body 54 has a U-shaped configuration formed by leg portions 130, 132 and a connecting wall portion 134. Jaw portions 136, 140 are integrally formed in the connecting wall portion 134 and provide gripping edges as hereinbefore described. A rod clamping means is provided in one of the leg portions 130 by jaw sections 142, 144, 146, 148 which allow the clip to slip on the end of the crank arm during assembly and thereafter be resiliently held in place. Crank arm 38 may have a key-shaped end portion provided by a flange 150 which is received in a hole of corresponding shape in leg portion 132, FIG. 16, and abuts the leg portion 130 in the assembled position, as shown in FIG. 14, to provide positive orientation and prevent rotation of the clip.

ASSEMBLY OF THE WIRE CLIPS

Referring now to FIGS. 9–13, an illustrative assembly operation would first involve association of the clip with the control lever. The clip is positioned above the slot in the control lever and pushed through the slot by pressure exerted on pressure surface 102, for example. With clips of the type shown in FIGS. 4–8, an assembly tool may be provided to radially compress the clip for insertion through the lever slot. Tab 128 is compressed as it passes through the slot and springs back beneath the control lever to hold the clip in place in combination with tabs 124, 126. The proper orientation of the clip is assured by the L-shaped configuration of the slot 122 and the clip flange 120.

Then the coiled end 42 of the wire is placed over the crank arm 38 and the straight end of the wire is threaded between surfaces 116, 118 and hole 114 on the opposite wall of the clip. Wire 28 may be provided with a locating means 151 in the form of a bend or the like whereby the proper length of wire between the shutter and the control lever is established for the adjustment step. With a jaw arrangement as shown in FIG. 9, the wire is adjustably movable relative to the clip in the direction of arrow 152 but not in the opposite direction. The position of the wire relative to the clip in FIGS. 9 and 11 is intended to show the relationship prior to adjustment. The position of the control lever at this time is intermediate the extreme positions and, preferably, near the extreme position for which the adjustment is to be made. The wire is connected to the clip by downward pressure, indicated by arrows 154, FIGS. 10–11, to cause the wire to move downward between the jaw elements 104, 106 onto support surface 112. At this time, biting edges 108, 110 provide an adjustable connection between the clip and the wire.

Adjustment of the control system is effected by moving the control lever 19 from the intermediate position toward the extreme position in the direction of arrow 156. Wire 28 will be moved with the clip in the direction of arrow 156 until the shutter is seated in an extreme position. If the control lever is not yet at the extreme position, it is forced to the extreme position with the wire 28 sliding through the jaw elements in the direction of arrow 152. A permanent connection is thus established and thereafter no further movement of the wire relative to the clip will occur because the control lever cannot be moved further in the direction of arrow 156 and the jaw elements 104, 106 will not permit sliding movement of the wire in the opposite direction of arrow 156.

Sheath clip of FIGS. 20–25

Referring now to FIGS. 20–25, an adjustment clip means for the sheath 30 is shown which may be utilized separately or in conjunction with the previously described adjustment clip means for wire 28 of FIGS. 2–19. Furthermore, while the clip is particularly adapted for use with the sheath, it is to be understood that the clip is also adaptable for use with the wire. In the environment of FIG. 1, the location of a sheath clip is indicated at 160, 162. The sheath adjustment apparatus comprises an assembly of a clip means 164, support means 166, and ribbed means 168 on the periphery of the sheath 30.

The clip means 164 comprises an integral base portion 170 and a wasp-shaped sheath retaining portion 172 formed from spring steel sheet material or the like. The base portion 170 is channel-shaped and has a cross-section generally corresponding to the cross-sectional shape of the support means 166 which may be in the form of a bracket arm or the like made from steel bar stock or sheet material as shown generally at 32, 34 in FIG. 1. Retaining and locating means 174, 176, 178 are provided on the arm for cooperative engagement with the clip means 164. In the illustrative embodiment, the retaining means is in the form of openings 174, 176 in the arm which are adapted to have projections 180, 182 on the base portion of the clip sprung thereinto during assembly. A projection 178 on the outboard end of the arm may be provided to insure that the clip is properly assembled on the arm. Projection 178 is located on the arm so as to pass between the ends of the base portion 170 when the clip is in the proper position. If the clip is turned upside down, projection 178 will abut the base of the clip and prevent sliding movement. A shoulder (not shown) may be provided on the bar to further locate and hold the clip by limiting sliding movement along the support bar. Projections 180, 182 are formed in deflectable extensions of the channel side walls so that the clip means is slidable along the bar with the surfaces 184, 186 in engagement with the bar until the openings 174, 176 are reached at which time the projections 180, 182 will spring into the openings with the conical side surfaces 188 bitingly engaged by bar edges 190.

Figure 20:
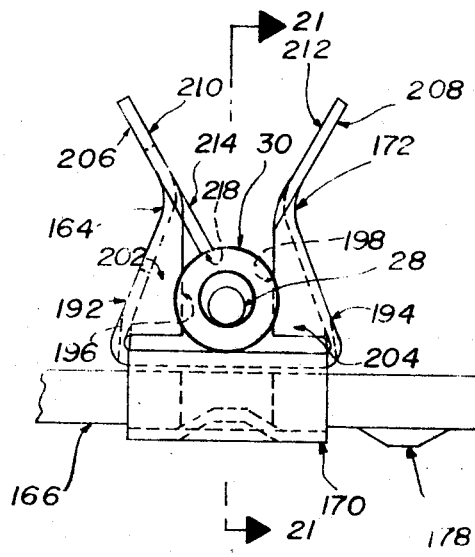
FIG. 20 is a side elevational view of another type of adjustment clip assembly.
Figure 21:
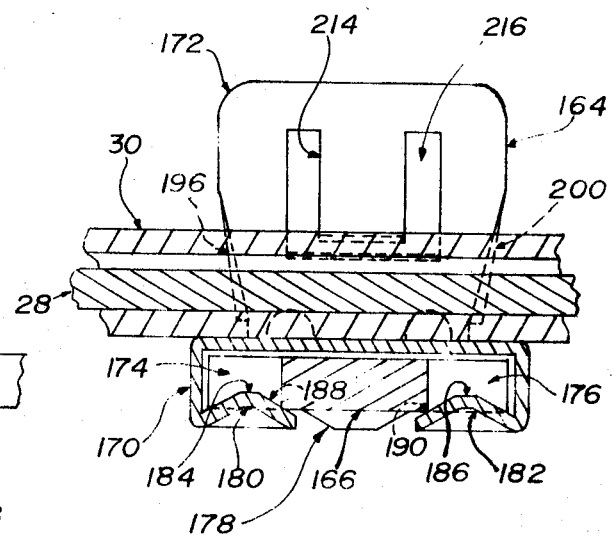
FIG. 21 is a cross-sectional view taken along the line 21—21 in FIG. 20.

The sheath retaining portion of the clip means comprises a pair of spaced upstanding resilient deflectable flange portions 192, 194 which define a sheath gripping jaw cavity therebetween. Jaw means are provided by two axially spaced pairs of oppositely facing parallel biting edges. One pair of edges 196, 198 are shown in FIG. 20 and one edge 200 of the other pair of edges is shown in FIG. 21. The edges are formed along triangular shaped flanges 202, 204 extending inwardly toward one another from the flange portions 192, 194. The upper ends 206, 208 of the flange portions are outwardly bent to form a V-shaped assembly trough by which the cable is more easily located in the jaw cavity. Inclined inner surfaces 210, 212 form an assembly guideway and also provide elongated force applying surfaces for spreading the jaw means by outward deflection of the flange portions 192, 194. In order to retain the sheath in the clip, one or more retention flange means 214 is formed in the upper end 206 of one of the flange portions by a U-shaped slot 216. The bottom edge 218 of the retention flange is adapted to releasably bitingly engage the peripheral surface of the sheath and prevent the sheath from being lifted out of the jaw pocket. A plane parallel to and including flange means 214 intersects the flange portion from which it is formed at an acute angle and extends substantially radially relative to the sheath 30 so that maximum retention force is applied to the sheath. During assembly, the sheath is moved over the outer surface of the retention flange and snapped into the jaw pocket under the biting edge 218. The snap-in assembly provides a positive indication to the assembly worker that the sheath is properly seated within the clip. By reference to FIG. 20, it will be seen that the sheath is supported in the jaw cavity by the upper surface of the base plate and held by the jaw edges and the retention edge or edges.

Figure 22:
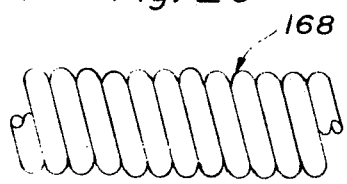
FIG. 22 is a detail view of the wire sheath of the assembly of FIG. 20.
Figure 23:
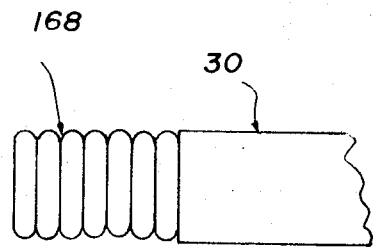
FIG. 23 is a detail view of a modified wire sheath for the assembly of FIG. 20.
Figure 24:
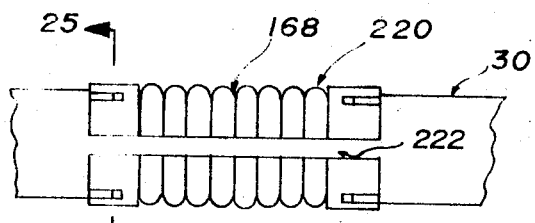
FIG. 24 is a detail view of another modification of the wire sheath of the assembly of FIG. 20.
Figure 25:
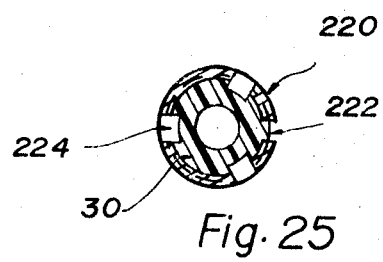
FIG. 25 is a cross-sectional view taken along the line 25—25 in FIG. 24.

Adjustment of the sheath is accomplished through controlled axial slippage of the sheath 30 within the jaw pocket over the jaw edges and along the retention edge. Controlled slippage for adjustment is accomplished by the ribbed means 168 on the outer periphery of the sheath. By overloading the system, the biting edges may be relocated from rib to rib along the sheath. With conventional wound metal sheaths, the ribs are provided by adjacent coils as shown in FIG. 22. In the case of molded plastic sheath, the ribbed means may be formed integrally as shown in FIG. 23 or a separate ribbed adjustment sleeve 220 may be clamped over the sheath. Sleeve 220 is shown to comprise a resilient tubular member having a longitudinal slot 222, enabling the sleeve to be resiliently clamped onto the sheath, and integral inwardly deflected biting tabs fixedly positioning the sleeve on the sheath.

Sheath clip of FIGS. 26–27

FIGS. 26–27 show a modification of the clip of FIGS. 20–21 in which a pressure surface 230 is provided to facilitate spreading of flanges 232, 234. Oppositely extending retention flanges 236, 238 are integrally formed in the side walls of the clip and located in planes which intersect the clip body at acute angles and extend radially relative to the sheath for the purposes heretofore described. A locating ferrule 240 may be staked to the sheath or integrally molded thereon to locate the adjustment end of the sheath in the proper adjustment position. An additional locating ferrule 248 may be utilized with ferrule 240 to provide locating means for properly positioning and permanently locating the end of the sheath opposite the adjustment end. The base portion has an improved clip-on attaching arrangement comprising a single finger 242 provided with a single detent 244 adapted to snap into a single hole 246 on the support bar. Locating projection 178 is offset to coincide with the gap between the sides of the base.

The adjustment method is essentially the same with the sheath clip as with the wire clip. In some situations, it may be desirable to utilize both a wire clip at one end of the system and a sheath clip at the same end or at the other end of the system.

Also, it is contemplated that the wire adjustment clip and/or the sheath adjustment clip may be used at both ends of the system. The use of the sheath adjustment clip depends upon the fact that the wire-sheath control means extends between the actuator device and the actuated device along a zig-zag path with the result that the free play of the wire within the sheath is limited to some extent by bends and turns along the length of the wire and sheath. Therefore, unwanted tension or slack in the system can be adjusted by lengthening or shortening the sheath by adjusting movement through a sheath adjustment clip. The adjusting force is applied through the wire at the bend areas within the sheath where the wire is located in substantial surface engagement with the sheath. With the present design of sheath clip, the sheath is able to float within the clip to a limited extent which allows the wire to seek a natural position with a minimum of binding. If wire clips are used at both ends of the control wire, the amount of adjustment at each end will likely vary, depending upon variations in the control system. If a wire clip and a sheath clip are used at the same end or at opposite ends of the system, the amount of adjustment obtained by movement of the sheath through the sheath clip is limited by the axial distance between adjacent grooves whereas the amount of adjustment obtained by movement of the wire through the wire clip is substantially unlimited. The amount of relative movement obtained by movement of the sheath through the sheath clip and by movement of the wire through the wire clip will likely vary from installation to installation depending on manufacturing and assembly variations.

Various other modifications of the illustrative clip designs and adjustment methods will be apparent to those skilled in the art to which this invention relates. Therefore, it is intended that the appended claims be construed to apply to alternative embodiments of the inventive principles herein disclosed except so far as limited by the prior art.

I claim:

1. In a control system having movable control means in the form of a flexible cable comprising a wire and wire sheath, the wire being operatively connected to a movable actuator device at one end and to a remotely located movable actuable device at the other end, the movable actuator device being movable by application of a normal manipulation force between first and second extreme selection positions, and the movable actuable device being movable between first and second extreme operating positions in response to movement of the actuator device, the invention of adjustment means to locate and correlate the extreme selection positions of the movable actuator device relative to the extreme operating positions of the movable actuable device so that the movable actuator device is located in at least one of the extreme selection positions at the same time that the movable actuable device is located in one of the extreme operating positions and comprising:

first connection means connecting said wire to said movable actuable device whereby manipulative movement of said wire causes responding manipulative movement of said movable actuable device, second connection means connecting said wire to said movable actuator device whereby manipulative movement of said movable actuator device causes responding movement of said wire, and at least one of the connection means comprising a separate one-piece adjustment clip means having self-releasing resilient spring-like gripping jaw means adjustably connecting the wire to one of the devices and permitting sliding positional adjustment between the wire and the one of the devices by self-release upon application of a predetermined adjustment force in excess of the normal manipulation force when the positions of the devices are not properly correlated thereby to adjust the relative positions of the devices and thereafter permanently holding the wire and the one of the devices in the adjusted position during subsequent applications of normal manipulation forces, said self-releasing resilient spring-like gripping jaw means being formed on the edges of opposite spaced side walls of said clip means and defining an open wire receiving channel permitting the wire to be associated with said jaw means of the clip means by movement transverse to the actuating movement of the wire.

2. The invention as defined in claim 1 and said self-releasing resilient spring-like gripping jaw means being oriented to permit adjusting movement of the wire in only one direction.

3. The invention as defined in claim 1 and said adjustment clip means comprising:

a one-piece clip member formed from spring steel sheet material and having an integral attachment portion and an integral gripping portion, said self-releasing resilient spring-like gripping jaw means being integrally formed on said gripping portion, and resilient clip holding means integrally formed on said attachment portion and being deflectable to permit said clip means to be associated with said one of the devices and then releasable to hold said clip means in association with said one of the devices.

4. The invention as defined in claim 1 and having locating means on said wire to enable the proper length of wire to be located between the other of the devices and the jaw means whereby the desired adjustment will be effected upon application of an adjustment force in excess of the normal manipulating force.

5. The invention as defined in claim 1 and wherein said jaw means are formed by oppositely facing curved surfaces providing biting edges engageable by substantially line contact with the wire.

6. The invention as defined in claim 1 and said open wire receiving channel having inclined converging approach surfaces on said clip means adjoining said jaw means to facilitate transverse movement of said wire between said jaw means.

7. The invention as defined in claim 1 and wherein said one of the devices comprises an attachment rod, said clip means comprising:

a one-piece box-like member formed from spring steel sheet material and having at least three side wall portions two of which are located opposite one another in spaced parallel relationship with the third interconnecting the other two, a pair of aligned openings formed in the two side wall portions and receiving said rod, one of said openings having integral resilient holding flange means formed thereabout and expandable into biting engagement with said rod upon insertion through said openings, and the jaw means being formed in the third side wall portion and defining a jaw cavity receiving said wire in a position extending transversely of said rod and parallel to said two side wall portions.

8. The invention as defined in claim 7 and having a locating flange formed on said rod, and one of said openings in one of the two side wall portions having a corurged by the spring 13 will have no effective action. responding configuration to said rod and said locating flange and being oriented to cause the jaw means to be located in the adjustment position.

9. An adjustment clip for connecting a movable flexible cable control means between a movable actuator device and a remotely located movable actuable device, the movable actuator device being movable by application of a normal manipulation force between first and second extreme positions, and the movable actuable device being movable between first and second extreme operating positions in response to movement of the actuator device, and comprising:

a one-piece unitary clip member of formed spring steel sheet material having a base portion and spaced side wall portions extending outwardly from said base portion, the base portion and side wall portions defining an elongated channel open at opposite ends between the side wall portions and open throughout the length of the channel opposite the base portion, the width and length of the channel being such as to receive a substantial length of said control means between said side wall portions and above said base portion, at least one pair of self-releasing resilient spring-like gripping jaw means integrally formed on said side wall portions opposite one another and extending outwardly relative to said base portion and facing each other across the channel and defining a jaw cavity therebetween, the jaw cavity being open to the channel on the side opposite the base portion so as to receive the control means therebetween, and the jaw means being outwardly expandable from an unsprung position defining a jaw cavity of smaller width than the control means to a resiliently sprung position grippingly receiving opposite side surfaces of the control means therebetween and extering a spring force holding the control means in fixed relationship to the clip member during application of normal mainpulative forces to the control means, and the jaw means adjustably releasing the control means upon application of adjustment forces in excess of the normal manipulation force to permit adjustment of the position of the control means relative to the clip member, the adjustment being caused by application of force parallel to said control means and said channel and transverse to the direction of application of the spring force to the control means through the jaw means.

10. The invention as defined in claim 9 in combination with control means comprising a control wire element and a wire sheath element, and wherein the control wire element is releasably held between said jaw means.

11. The invention as defined in claim 9 and having resilient retaining flange means integrally formed in at least one of the two side wall portions and extending inwardly and downwardly in said channel toward the base portion to engage the control means between the two side wall portions opposite the base portion and to slidably hold said control means in the channel and permit longitudinal sliding movement while preventing transverse movement of the control means.

12. The invention as defined in claim 9 in combination with a first clip orientation means located on one of the devices, an attachment means integrally formed on said clip member and holding said clip member on the one of said devices, said attachment means including second orientation means cooperable with the first orientation means on said one of the devices to locate said jaw means in the adjustment position.

13. The invention as defined in claim 9 in combination with one of the devices and said clip member further comprising oppositely extending attachment flanges reversely bent to define an attachment channel having a cross-sectional configuration generally corresponding to the cross-sectional configuration of the one of the devices so as to permit sliding movement of the clip member along the one of the devices to an assembly position, and retention means effective in the assembly position to hold the clip member on the one of the devices.

14. The invention as defined in claim 9 and said clip member comprising:
an integral attachment portion and an integral gripping portion,
said jaw means being integrally formed on said gripping portion,
and resilient clip holding means integrally formed on said attachment portion and being deflectable to permit said clip member to be associated with one of the devices and then releasable to hold said clip member in association with the one of the devices.

15. The invention as defined in claim 9 in combination with an attachment opening in one of the devices and said clip member further comprising:
a circumferential slot extending substantially about the entire periphery of said clip member and separating the major part of said base portion from said side wall portions,
a longitudinal slot intersecting said circumferential slot and separating said base portion into radially extending spring finger portions which are compressible to permit insertion of the base portion through said attachment opening and releasable after insertion to hold said clip member on the one of the devices, another longitudinal slot intersecting said circumferential slot and separating said side wall portions into adjacent resilient jaw portions which are expandable to permit insertion of said control means therebetween and engageable with said control means under spring tension to grip and hold the control means during application of normal manipulation forces while permitting sliding adjustment of the control means relative to the resilient jaw portions upon application of adjustment forces in excess of the normal manipulation forces.

16. The invention as defined in claim 9 in combination with an attachment opening in one of the devices and wherein said clip member comprises:
a one-piece box-like body portion including said spaced side wall portions and another side wall portion located opposite the spaced side wall portions,
said base portion extending from said body portion and adapted to be inserted through the attachment opening in the one of the devices,
integral resilient holding means compressible during insertion of the base portion through the attachment opening and being thereafter expandable to hold the clip member on the one of the devices,
and a guide opening in the other side wall portion opposite the jaw cavity to receive the control means which extends through and between the spaced side wall portions.

17. The invention as defined in claim 9 and said jaw means being separated by a longitudinally extending slot of a width narrower than the width of said control means and terminating in biting edges diverging outwardly toward and intersecting a transversely extending abutment surface which in conjunction with said biting edges defines a substantially triangularly shaped jaw cavity having an unsprung clearance less than the width of the control means so as to be held expanded by the control means in biting engagement therewith.

18. The invention as defined in claim 9 in combination with control means comprising a control wire element and a wire sheath element, and wherein the sheath element of said control means is releasably held between said jaw means.

19. The invention as defined in claim 18 and wherein the sheath element of said control means is provided with a series of circumferentially extending adjacent grooves permitting sliding movement of said sheath element relative to said jaw means in step by step fashion from groove to adjacent groove along said sheath element.

20. The invention as defined in claim 19 and wherein said grooves being integrally formed on said sheath element.

21. The invention as defined in claim 19 and wherein said grooves being formed on a separate sleeve element, and attaching means fixedly holding said sleeve element on said sheath element.

22. The invention as defined in claim 11 wherein said retaining flange means intersects the associated side wall portion at an acute angle and extends generally radially relative to said control means.

23. The invention as defined in claim 22 and said retaining flange means and said jaw means defining a snap-in pocket for said control means whereby said control means is insertable into the clip member by transverse movement into the channel over the retaining flange means by resilient deflection thereof until the control means seats in the pocket at which time the retaining flange means springs back over the control means.

24. The invention as defined in claim 23 and the outer portions of the two side wall portions outwardly diverging from said pocket to provide an elongated guide trough and engageable with a substantial length of the control means to distribute assembly forces over the length of the clip member during positioning of the control means in the pocket.

25. The invention as defined in claim 13 and wherein said retention means comprises deflectable tab means on said attachment flanges and slot means in the one of the devices to receive the deflectable tab means.

26. The invention as defined in claim 13 and having orientation means effective during assembly to prevent movement of the clip member onto the one of the devices unless the jaw means are properly oriented for adjustment and comprising:
a slot between the attachment flanges extending in the direction of assembly movement, and projection means on one side of the one of the devices located so as to be aligned with the slot when the clip member is properly oriented.

27. The invention as defined in claim 14 in combination with support means for said clip member on the one of the devices comprising:
a generally circular mounting opening in said support means adapted to receive the attachment portion,
said clip member being elongated and tubular,
an intermediate portion of said clip member being of corresponding circular cross-sectional configuration and rotatably supporting said clip member one the one of the devices to enable the direction of movement of said control means and the one of the devices to remain parallel at the connection therebetween.

28. The invention as defined in claim 14 in combination with support means on the one of the devices for said clip member,
a non-symmetrical mounting opening in said support means adapted to forcibly insertably receive the attachment portion and thereafter retain said clip member, and
at least a portion of the attachment portion being non-symmetrical and correlated to said mounting opening to provide locating means whereby the attachment portion is insertable in the mounting opening only when the clip member is in proper orientation relative to the control means and the one of the devices.

29. The invention as defined in claim 28 and wherein said non-symmetrical mounting opening being of generally D-shaped cross-sectional configuration providing a flat chordal side surface,
said jaw means comprising flange portions extending generally parallel to said flat chordal side surface and defining a jaw opening extending generally transversely to said flat chordal side surface,
said control means extending between said jaw means through said jaw opening generally transversely to said chordal side surface,
the direction of adjusting movement of said control means through said jaw means being inwardly away from said flat chordal side surface so as to permit said jaw means to spring open upon exertion of an adjusting force,
and movement of said control means in the opposite direction causing abutting engagement of the flat chordal side surface and the flange portions and tending to close said jaw means to prevent movement of said control means relative thereto in the opposite direction.

30. The invention as defined in claim 15 in which a pressure applying surface is provided at one end of said clip member for applying a longitudinally directed assembly force to mount the clip member on the one of the devices.

31. The invention as defined in claim 15 and having opposite facing circumferential ridges on said base portion and said side wall portions engageable with the edges of said attachment opening in the one of the devices to permanently hold the clip member in said attachment opening in the one of the devices.

32. The invention as defined in claim 31 and wherein said attachment opening having spaced circumferential edges, and said opposite facing circumferential ridges have rounded outer peripheral surfaces providing substantially line contact with said edges of said attachment opening.

33. The invention as defined in claim 15 in which the cross-sectional configuration of said attachment opening and the base portion of said clip member are symmetrical so as to permit rotation of said clip member relative to the one of the devices and enable said clip member to be self-aligning during actuation of said control means.

34. The invention as defined in claim 14 in combination with support means having spaced abutment surfaces, said control means being held between said jaw means in abutting engagement with one of the spaced abutment surfaces, and said holding means being in abutting engagement with the other of the spaced abutment surfaces whereby to retain said clip member on said support means after assembly.

35. The invention as defined in claim 16 and having another side wall portion extending across the side wall portions and providing a pressure surface by which longitudinally applied forces are transferred to insert the clip member in the opening in the one of the devices.

36. The invention as defined in claim 16 and said base portion and said attachment opening having an L-shape cross-sectional configuration whereby said jaw means are located in predetermined relationship to said control means after mounting of said clip member on the one of the devices.

References Cited

UNITED STATES PATENTS

| 1,325,286 | 12/1919 | Garber | 74—501 X |
|---|---|---|---|
| 3,150,539 | 9/1964 | Wallis | 74—501 |
| 3,253,480 | 5/1966 | Fernberg | 74—501 |
| 3,366,405 | 1/1965 | Sevrence | 74—501 X |

FOREIGN PATENTS

| 157,114 | 11/1932 | Switzerland. |
|---|---|---|
| 220,746 | 3/1959 | Australia. |

WESLEY S. RATLIFF, JR., Primary Examiner

U.S. Cl. X.R.

287—126

Notice of Adverse Decision in Interference

In Interference No. 97,610, involving Patent No. 3,513,718, J. J. Tomecek, CONTROL SYSTEM ADJUSTMENT MEANS, final judgment adverse to the patentee was rendered Feb. 26, 1974, as to claim 1.

[*Official Gazette July 8, 1975.*]